(12) United States Patent
Panje

(10) Patent No.: US 12,101,225 B2
(45) Date of Patent: Sep. 24, 2024

(54) SOFT CONFIGURATION AND DATA EXCHANGE FOR IN-HOME DEVICES

(71) Applicant: ARRIS Enterprises LLC, Suwanee, GA (US)

(72) Inventor: Krishna Prasad Panje, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 24 days.

(21) Appl. No.: 17/317,635

(22) Filed: May 11, 2021

(65) Prior Publication Data

US 2021/0266226 A1     Aug. 26, 2021

Related U.S. Application Data

(63) Continuation of application No. 15/841,678, filed on Dec. 14, 2017, now Pat. No. 11,038,757.

(51) Int. Cl.
*H04L 29/06*      (2006.01)
*H04L 9/40*       (2022.01)
(Continued)

(52) U.S. Cl.
CPC ...... *H04L 41/0886* (2013.01); *H04L 41/0806* (2013.01); *H04L 41/12* (2013.01); (Continued)

(58) Field of Classification Search
CPC . H04L 41/0886; H04L 41/0806; H04L 41/12; H04L 63/083; H04L 41/14;
(Continued)

(56) References Cited

U.S. PATENT DOCUMENTS

| 7,969,975 B2 | 6/2011 | Jiang |
| 9,026,787 B2 | 5/2015 | Kufluk |

(Continued)

OTHER PUBLICATIONS

Ted Boone, et al., "Cost modeling for customer premises equipment", Jna. 23-26, 2017, 2017 Annual Reliability and Maintainability Symposium (RAMS), pp. 1-5.

*Primary Examiner* — Jeffery L Williams
(74) *Attorney, Agent, or Firm* — Wenderoth, Lind & Ponack, L.L.P.

(57) ABSTRACT

A method of configuring a client device at a customer premises is provided. An electronic message is received from a vendor of a client device with customer premise equipment (CPE) at the customer premises or a portable communication device. The electronic message provides configuration information for the client device. The configuration information includes a password and an access name of a service for use in configuring the client device via communications with a remote configuration server. The service is made available at the customer premises via the CPE or the communication device so that the client device automatically pairs to the service and is authenticated with the password to the configuration server via Internet connectivity capability of the CPE or portable communication device so that the client device may be configured. The client device has firmware preprogramed to automatically and securely access the service, when detected, at the customer premises.

13 Claims, 4 Drawing Sheets

(51) Int. Cl.
  *H04L 41/08* (2022.01)
  *H04L 41/0806* (2022.01)
  *H04L 41/12* (2022.01)
  *H04W 8/24* (2009.01)
  *H04W 12/06* (2021.01)
  *H04W 48/16* (2009.01)
  *H04W 4/70* (2018.01)

(52) U.S. Cl.
  CPC ............ *H04L 63/083* (2013.01); *H04W 8/24* (2013.01); *H04W 12/06* (2013.01); *H04W 48/16* (2013.01); *H04W 4/70* (2018.02)

(58) Field of Classification Search
  CPC ...... H04L 43/04; H04L 41/0813; H04W 8/24; H04W 12/06; H04W 48/16
  See application file for complete search history.

(56) References Cited

U.S. PATENT DOCUMENTS

| | | | |
|---|---|---|---|
| 9,258,298 B2 | 2/2016 | Ansley | |
| 9,729,546 B2 | 8/2017 | Khan | |
| 10,111,277 B2 | 10/2018 | Deros | |
| 10,153,908 B2 | 12/2018 | Kravitz | |
| 10,182,304 B2 | 1/2019 | Vyas | |
| 10,461,960 B2 | 10/2019 | Ebling | |
| 10,666,512 B2 | 5/2020 | Sakura | |
| 11,038,757 B2 * | 6/2021 | Panje | H04L 12/2898 |
| 11,219,026 B2 * | 1/2022 | Kakinada | H04W 4/80 |
| 2006/0221940 A1 | 10/2006 | Ong | |
| 2010/0263022 A1 | 10/2010 | Wynn | |
| 2013/0115945 A1 | 5/2013 | Holostov et al. | |
| 2013/0272164 A1 * | 10/2013 | Leonardos | H04W 8/22 370/254 |
| 2014/0051391 A1 | 2/2014 | Torres et al. | |
| 2014/0250509 A1 * | 9/2014 | Ansley | H04W 12/06 709/221 |
| 2015/0063331 A1 | 3/2015 | Scahill et al. | |
| 2015/0117409 A1 | 4/2015 | Ghai | |
| 2015/0237462 A1 * | 8/2015 | Han | H04W 4/80 455/404.1 |
| 2015/0242066 A1 * | 8/2015 | Chen | H04L 41/0856 715/738 |
| 2015/0271745 A1 * | 9/2015 | Knowles | H04W 8/24 370/254 |
| 2015/0327065 A1 | 11/2015 | Mildh et al. | |
| 2016/0085538 A1 * | 3/2016 | Finch | G06F 8/65 717/172 |
| 2016/0294828 A1 | 10/2016 | Zakaria | |
| 2017/0222884 A1 | 8/2017 | Denneler | |
| 2017/0223479 A1 | 8/2017 | Ly | |
| 2017/0257257 A1 | 9/2017 | Dawes | |
| 2017/0353859 A1 * | 12/2017 | Idnani | H04W 12/08 |
| 2018/0006829 A1 * | 1/2018 | Kravitz | H04W 12/06 |
| 2018/0110093 A1 * | 4/2018 | Deros | H04W 4/021 |
| 2018/0167228 A1 | 6/2018 | Elcock | |
| 2019/0013945 A1 | 1/2019 | Hamlin | |
| 2019/0052676 A1 | 2/2019 | Giokas | |
| 2019/0190782 A1 * | 6/2019 | Panje | H04L 67/34 |
| 2019/0215180 A1 * | 7/2019 | Britt | G05B 15/02 |
| 2019/0357028 A1 * | 11/2019 | Lou | H04L 67/12 |
| 2019/0394651 A1 | 12/2019 | Wifvesson | |
| 2020/0037160 A1 * | 1/2020 | Bartlett | H04W 4/38 |
| 2020/0169886 A1 | 5/2020 | Bhatt | |
| 2020/0178237 A1 * | 6/2020 | Kakinada | H04W 72/0446 |
| 2020/0204673 A1 * | 6/2020 | Barathan | H04W 4/70 |
| 2020/0279626 A1 | 9/2020 | Ansari | |
| 2020/0295933 A1 * | 9/2020 | Link, II | H04W 4/70 |
| 2021/0084106 A1 * | 3/2021 | Brickell | H04L 67/12 |
| 2021/0266226 A1 * | 8/2021 | Panje | H04W 48/16 |
| 2021/0274333 A1 * | 9/2021 | Petersen | H04W 8/18 |

* cited by examiner

SOFT CONFIGURATION AND DATA EXCHANGE FOR IN-HOME DEVICES

BACKGROUND

The Internet of Things (IoT) is a computing concept that describes an idea of everyday physical objects being connected to the Internet and being represented digitally and able to identify themselves to other IoT devices. Accordingly, the IoT represents a system of interrelated computing devices, mechanical and digital machines, appliances, objects, and the like that are provided with unique identifiers and the ability to transfer data over networks without requiring human-to-human or human-to-computer interaction. An IoT device may connect and communicate with other IoT devices in an intelligent fashion and thereby provide part of a relatively large information gathering system.

IoT and other client devices and the like necessarily need to be initially provisioned and configured, for instance, at a customer premises or like location before being placed into intended IoT use or service. Provisioning and configuring an IoT device preferably should require little or no user intervention.

Many relatively simple IoT or like client devices may not have associated user interfaces, displays, screens, touchpads or the like for use in enabling ready provisioning and configuring such as via secure pairing, i.e., Bluetooth pairing or the like. In addition, in many cases, the user or owner of an IoT device may have to manually turn-on Bluetooth communications and/or manually download an application from a store, discover the IoT device, and manually pair the device to initially configure and provision the device. In addition, many client and/or IoT devices are not capable of hosting a web server through Wi-Fi or the like and may not have a dedicated Ethernet port or the like. Accordingly, pairing and provisioning/configuring and subsequent data sync processes in connection with relatively simple IoT devices which may have limited capability can be relatively complicated and/or require significant user intervention to accomplish.

SUMMARY

According to an embodiment, a method of configuring a client device at a customer premises is provided. An electronic message is received from a vendor of a client device with customer premise equipment (CPE) at the customer premises or a portable communication device. The electronic message provides configuration information for the client device. The configuration information includes a unique password and an access name/type of a service for use in configuring the client device via communications with a remote configuration server and/or web portal. The service is made available at the customer premises via the CPE or the communication device so that the client device automatically pairs securely to the service using the provided password and is then able to be authenticated with the configuration server or web portal via Internet connectivity capability of the CPE or portable communication device so that the client device may be configured. The client device has firmware preprogramed to automatically access the service, when detected, at the customer premises.

According to another embodiment, customer premise equipment (CPE) comprising at least one processor is provided and is configured to receive an electronic message from a vendor of a client device. The electronic message provides configuration information for the client device, and the configuration information includes a unique password and an access name of a service for use in configuring the client device via communications with a remote configuration server. The at least one processor is also configured to make the service available at the customer premises so that the client device automatically pairs securely to the service and is authenticated to the configuration server via Internet connectivity capability of the CPE so that the client device may be configured. The client device has firmware preprogramed to automatically access the service, when detected, at the customer premises.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
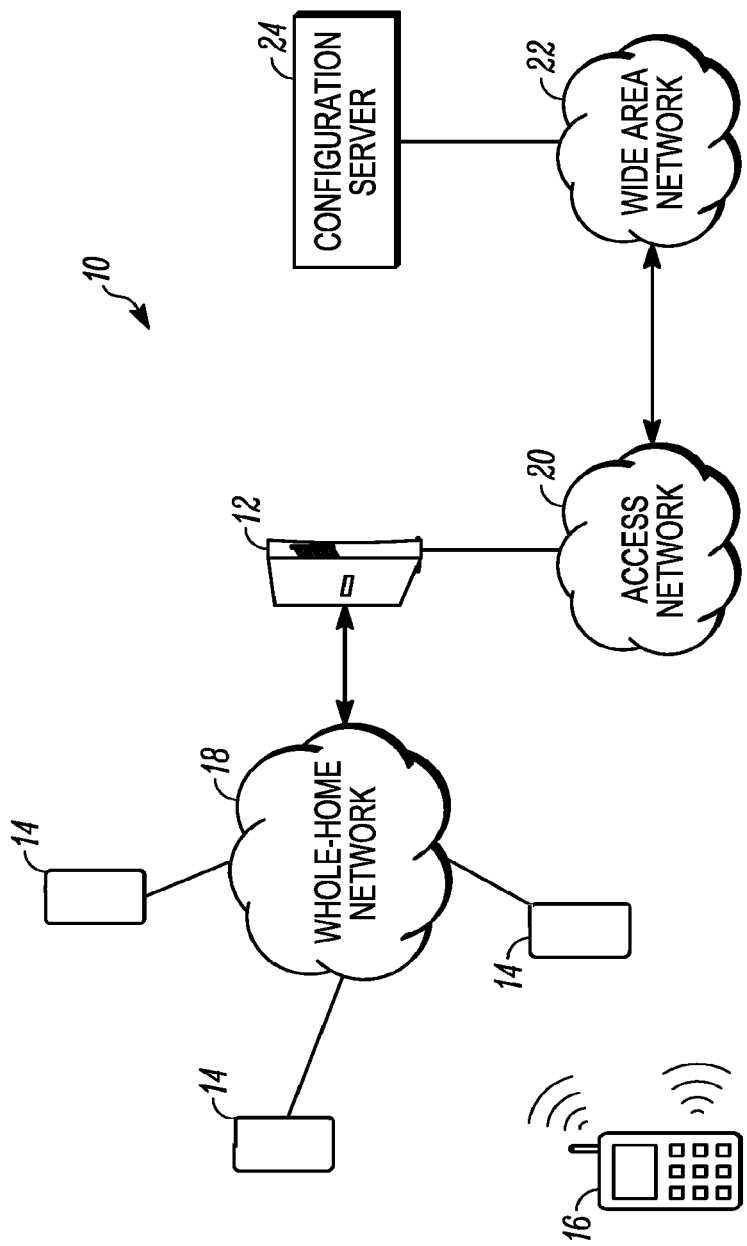
FIG. 1 is block diagram of a typical network environment operable to facilitate the initial configuration of a client device at a customer premises in accordance to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A Multi System Operator (MSO) may provide a complex system of services that may include television, internet, telephone, wireless, and like services to consumers over various networks. As used herein, the term "Customer Premise Equipment" (CPE) refers to any hardware equipment, such as cable modems, gateways, extenders, and the like that may be provided and installed at a home, business, or like customer premises by a MSO.

In particular, a Gateway (GW) generally refers to a node on a network that serves as an entrance to another network. For instance, a GW may provide an Internet Service Provider (ISP) service that is able to connect client devices at a customer premises to the Internet. A GW is typically considered to be on the "edge" of a network as all data must flow through the GW before coming in or going out of the network. As an example, a router is a common type of gateway used in a home network. It generally allows computers and other client devices, including IoT devices, within the local network to send and receive data over the Internet.

According to an embodiment, a Gateway, Wi-Fi extender, or like CPE device provides an in-home IoT Gateway that may be able to aggregate and manage IoT use within the customer premises. Examples of IoT devices may include smart light bulbs, a smart thermostat, a smart refrigerator, or any other relatively common appliance or device that may be located at a customer premises. A Bluetooth low energy (BLE) IoT device may utilize a smartphone or in-home IoT Gateway as an aggregator of such BLE devices and use applications provided on the Gateway or in the cloud to monitor and control such IoT devices.

Thus, an IoT Gateway may provide a means to bridge the gap between IoT devices and objects in the field (i.e., factory floor, home, etc.), the Cloud, where data is collected, stored and manipulated by enterprise applications, and user equipment (i.e., smartphones, tablets, appliances, etc.). The IoT Gateway provides a communication link between the customer premises and web portals in the Cloud and can also offer local processing and storage capabilities to provide off-line services and, if required, real time control over IoT devices.

IoT devices may include embedded firmware which is typically added to devices at the time of manufacture and is used to run programs on the device. Thus, firmware is software that allows hardware to run anything from smartphones to IoT devices, even including devices that may be thought of as being relatively simple that one might not imagine has computer control. For example, firmware may exist in a so-called smart light bulb, a smart thermostat, a smart refrigerator, or any other common appliance or device.

By way of example, FIG. 1 provides a block diagram illustrating an example network environment 10 operable to facilitate the pairing of a client device with a network service while minimizing user-input. The customer premise equipment (CPE) device 12 can route communications to and from one or more client devices 14 which in this case are IoT devices. The CPE device 12 may include a gateway, an extender, a cable modem, a wireless router including an embedded cable modem, a digital subscriber line (DSL) modem, a mobile hot-spot router, a multimedia over coaxial alliance (MoCA) node, and any other device that is operable to route communications to and from a client device. In addition, a mobile phone 16, such as a smartphone or the like, is also shown in FIG. 1.

The IoT devices 14 may be provided by a service provider or other vendor. In embodiments, the IoT devices 14 can communicate with the CPE device 12 or the mobile phone 16 via Bluetooth communications, via Wi-Fi communications, or both with or without use of the whole-home network 18 (e.g., MoCA network, wireless local area network (WLAN), etc.).

The CPE device 12 can route communications between client device(s) 14 and a wide area network (WAN) 22 via an access network 20. In embodiments, the access network 20 may include various networks such as coaxial cable, optical fiber, twisted pairs, wireless networks including 4G and LTE, and others. In embodiments, a WAN 22, for example, can operate using internet protocol (IP), directing data packets to and receiving data packets from the CPE device 12. In addition, the mobile phone 16 may be able to communicate with the access network 20 or WAN 22 via cellular data transmissions.

In embodiments, the IoT device 14 may retrieve information from a configuration server or web portal 24 via the WAN 22. For this purpose, the CPE device 12 and/or mobile phone 16 may provide one or more wireless networks with one or more SSIDs for IoT devices to access or one or more BT or BLE services for IoT devices to access.

According to an embodiment, a method is provided for first time or initial provisioning and/or configuring of an IoT and/or client device of limited capability (i.e., without a user interface such as a display screen and/or tough pad or the like). The client device may also not be able to host a web server (through Wi-Fi or the like) and may offer no web page to configure. In addition, many IoT devices do not have dedicated Ethernet ports. Thus, there is a need for a seamless pairing and provisioning/configuring mechanism for limited capability IoT devices on a Gateway or other CPE requiring minimal user intervention.

Embodiments are disclosed herein which provide such a mechanism for BT or BLE IoT devices (i.e., via Bluetooth communications or the like) and for Wi-Fi IoT devices (via Wi-Fi communications or the like). Thus, provisioning and configuring limited capability IoT devices may utilize Bluetooth (BT) communications, Wi-Fi communications, or the like to join configuring networks without necessarily requiring the input of any information on a user interface of the IoT device (which may or may not have a user interface).

By way of example, in a BT/BLE embodiment, firmware of a IoT client device may be programmed to look for or detect a predefined BLE service (i.e., a BLE vendor service) and to utilize a unique password to connect to the BLE service. According to one embodiment, a purchaser of a IoT device may provide a mobile telephone number or other electronic address, such as an email address, to a vendor when purchasing (i.e., via an on-line purchase or otherwise) the device or shortly thereafter. Configuration information (i.e., name and type of BLE service to detect and unique password) is delivered to the purchaser or user of the IoT device via use of the telephone number (i.e., via a text message, e-mail, or the like) The password may be tied to the mobile phone number or may be the phone number itself and knowledge of both may be required to enable the IoT device to become provisioned and configured.

Thus, the BLE service name and type and unique password are delivered to the mobile phone via an electronic message which may contain a link to the service or the like. Accordingly, after the electronic message, also referred to as a configuration message, is delivered to a CPE or mobile phone or the like and saved and/or launched with a browser of the CPE or mobile phone, the BLE and cellular data of the user's smart phone, CPE, or like electronic device is automatically turned on and provides a communication link to the BLE service and the IoT client device automatically pairs securely with the BLE service when detected using the password and/or telephone number.

Accordingly, in the above described process, there is no need for the user to turn on, discover and pair (secure or non-secure) the IoT device; rather, the configuration message is merely launched or the like. After the IoT device is paired to the BLE service, the IoT device can be authenticated with a web portal on the cloud or the like and configured using a browser or application on the CPE or mobile phone with any required user data (for instance, if the user has to input certain data, such as age, height or home location etc, depending upon the utility of the IoT client device).

After the IoT device is configured, the BLE service is removed and the configuration message delivered to the mobile phone is no longer deemed to be valid. As an option, the smartphone, gateway, or like device can continue to offer the same BLE service in the future for synching data generated by the IoT device to a cloud portal or the like (which may be triggered either by user intervention or web service).

Figure 2:
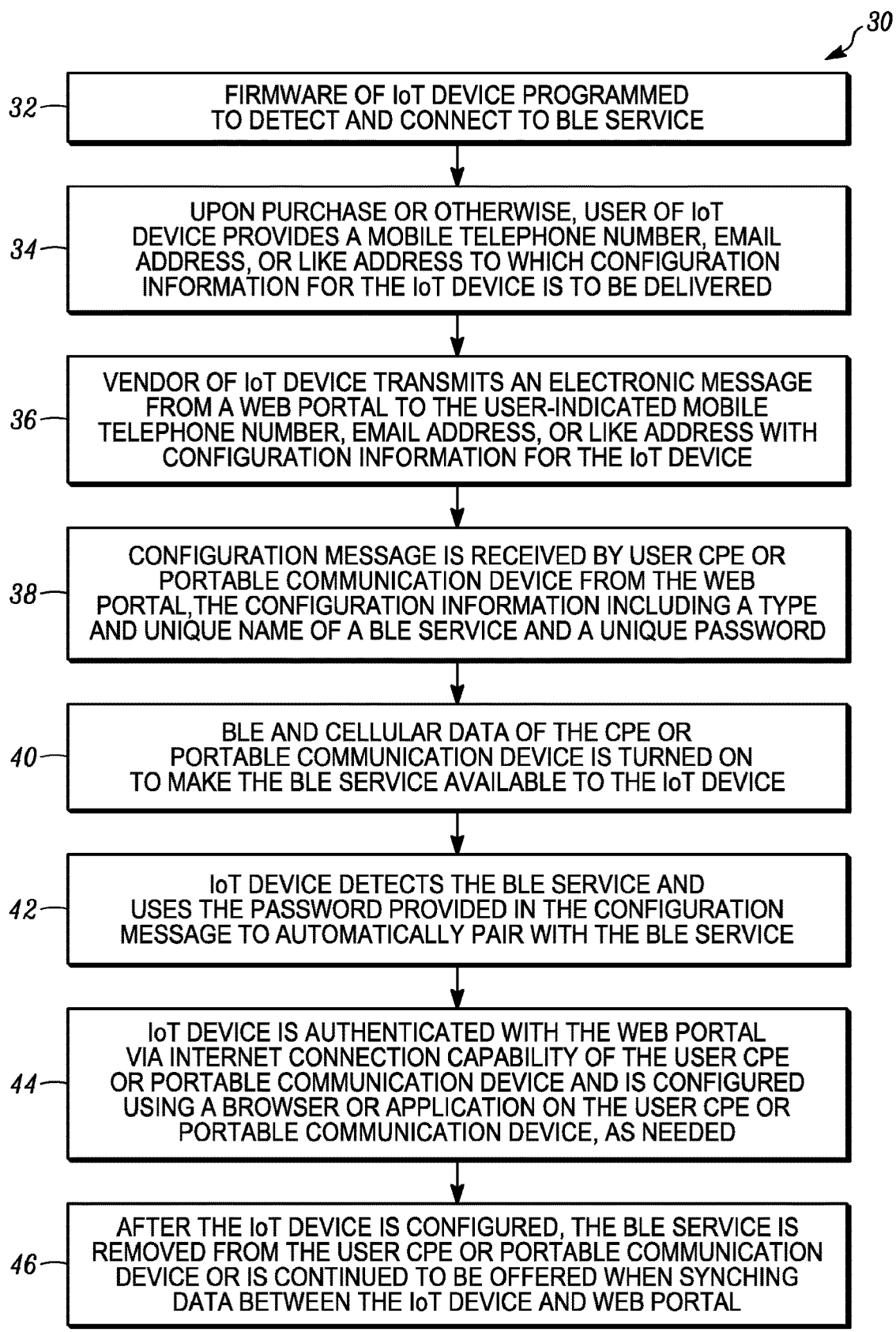
FIG. 2 is flowchart of a process for initially configuring a client device at a customer premises in accordance to an embodiment.

By way of example, a BT/BLE embodiment is best shown in FIG. 2 in which a process 30 of provisioning and/or configuring an IoT device includes programming the firmware of a purchased IoT device to detect and look for a predefined BLE service (i.e., a case which utilizes a BLE vendor service) (see step 32). A unique password needed to connect to the service may be provided at the time of purchase or as a result of purchase.

For example, the purchaser may provide a mobile telephone number or other electronic address to the seller of the IoT device (see step 34). The provided mobile telephone number or other electronic address may be used to deliver the configuration information to the purchaser, including the unique password. Such a sale may occur on-line or in-person. Accordingly, the unique service and unique password associated with the purchased client IoT device is delivered to the mobile telephone, smart phone, or other electronic device (see step 36). In this manner, the required password is tied to a mobile telephone number or other address, such as an email address of the like.

After a configuration message is received by the smart phone or like CPE device and is saved on the smart phone or a Gateway device (see step 38) and/or is launched via use of an Application (applet) on the smart phone or customer premises Gateway, the Gateway or mobile telephone's BLE and/or cellular data is turned on with this service (see step 40) and the client device pairs automatically with the BLE service using the password provided with the configuration message (see step 42). Accordingly, with this process, there is no need for the user to turn on, discover and/or pair (secure or non-secure) the IoT device.

As a result, the IoT client device may be authenticated with a web portal and configured using the browser or application on the CPE or mobile phone (see step 44) with all necessary user data, as required (i.e., this is needed only if the user is required to input certain data, such as age, height or home location etc., depending upon the utility of the IoT client device). After the IoT device is configured, the BLE service is removed from the GW or mobile phone and the configuration message delivered to the phone is no longer deemed to be valid (unless otherwise needed) According to an alternate embodiment, the GW and/or mobile phone continues to offer the same BLE service for purposes of synching the IoT device data to the portal (triggered either by user intervention or web service) (see step 46).

In an alternate Wi-Fi embodiment, firmware of an IoT client device is programmed to look for or detect a predefined Service Set Identifier (SSID) service and utilize a unique password to obtain access. The term "Wi-Fi" as used herein refers to technology for wireless local area networking of devices. A SSID is a network name which is typically provided as a case sensitive, thirty-two alphanumeric character, unique identifier attached to the header of packets sent over a wireless local area network (WLAN). The SSID differentiates one WLAN from another. As used herein, a wireless Access Point (AP) or Hot Spot refers to any networking hardware device that allows a Wi-Fi client device to connect to a network. A wireless client or Wi-Fi client refers to any electronic device capable of communicating with the AP, such as smartphones, tablet computers, laptops, and any device capable of Wi-Fi connection including set top boxes and like equipment.

At the time of purchase of the IoT device or thereafter, the user/owner/purchaser of the IoT device may provide their mobile telephone number to the vendor to which configuration information will be delivered. The SSID and unique password are delivered to a smart phone, for instance, via text or E-mail message or the like. Once the configuration message is delivered (saved and lunched with browser), the Wi-Fi Hot Spot (or Access Point (AP)) of a gateway is turned on with this SSID and the client IoT device pairs automatically.

The IoT device can then be authenticated with web portal and configured using the browser or application to provide any user data (i.e., if the user has to input certain data, such as age, height or home location etc., depending upon the utility of the IoT device). After the IoT device is configured, the SSID service and Hot Spot is removed, and the configuration message delivered to the GW or phone may no longer be deemed to be valid. As an option, the GW may continue to offer the same SSID service from then onwards for purposes of synching the IoT device and data generated thereby to a web portal (i.e., which may be triggered either by user intervention or web service).

Figure 3:
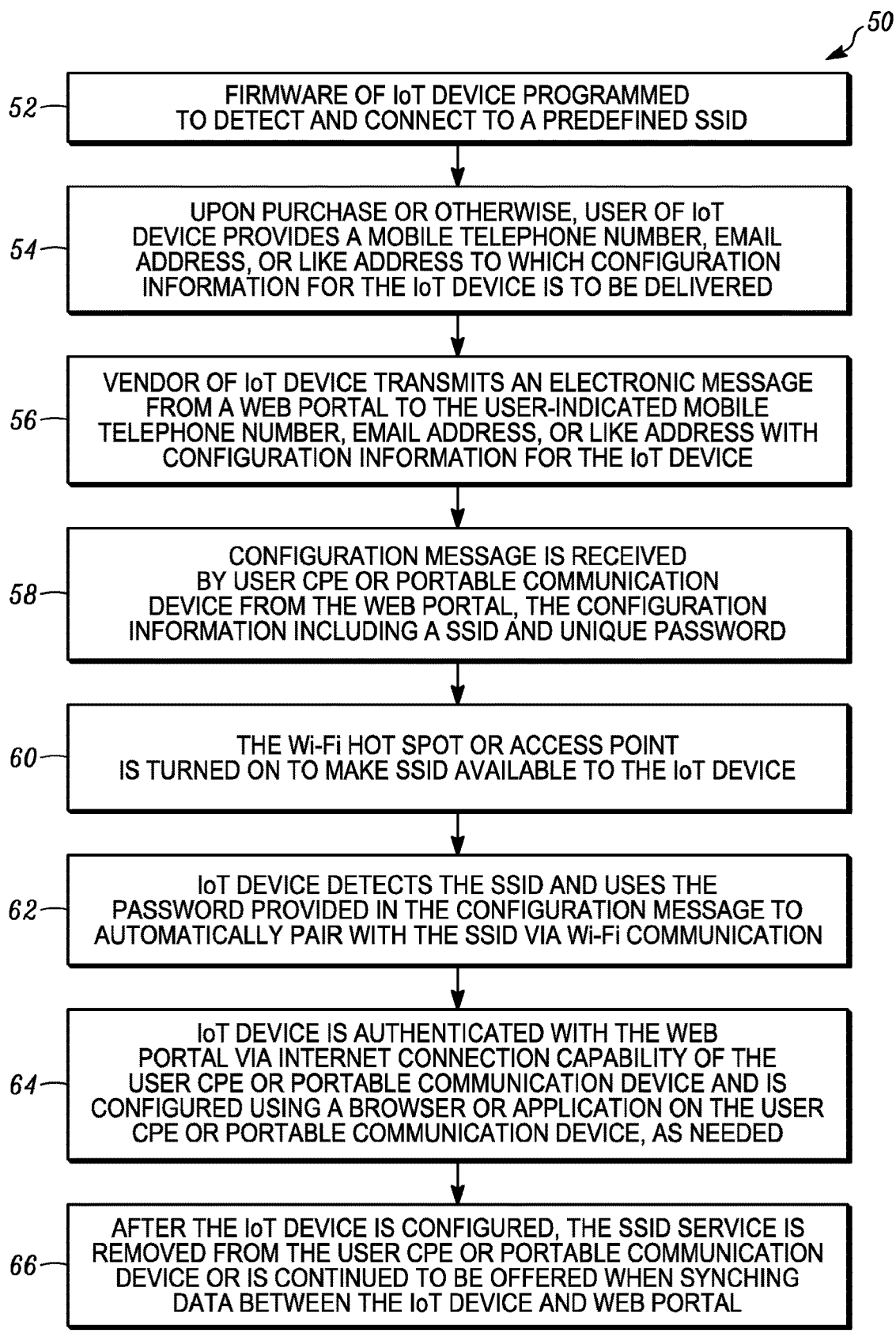
FIG. 3 is flowchart of an alternate process for initially configuring a client device at a customer premises in accordance to an embodiment.

FIG. 3 provides an example of a process 50 using Wi-Fi communications. The firmware of an IoT client device is programmed to look for a predefined SSID and password for use in connecting to the predefined SSID. See step 52. A purchaser of the IoT device provides a mobile telephone number or like address to which a configuration message may be delivered, such as by text message, email, or the like. See step 54. This process associates a unique password with the mobile phone number or other address provided at the time of sale or thereafter. The firmware of the new IoT device may be pre-programmed to look for a generic SSID but may require the use of a unique password. The password is different for different devices. Accordingly, via use of the password, the IoT device can be securely paired with a gateway and/or smart phone.

After the configuration message is delivered to a smartphone or CPE from the portal (see step 56) and received by the smartphone or CPE (see step 58), the SSID and password are saved on the CPE, such as a home Gateway device, or on the smartphone. Alternatively, the configuration message enables the launching of an Application (applet) which includes use of the SSID and password. Thus, after the configuration message is delivered, saved, and if needed launched with a browser of the CPE or smartphone, a Wi-Fi Hot Spot (or AP) of the phone (or GW) is turned on (see step 60) with the SSID, and the IoT client device securely and automatically pairs using the associated password (see step 62).

As a result, the IoT client device is authenticated with web portal and configured using the browser or application with all required user data (i.e., only needed if the user has to input certain data, such as age, height or home location etc., depending upon the utility of the IoT client device). See step 64.

After the device is configured, the SSID service and Hot Spot is removed, and the configuration message delivered to GW and/or phone is no longer deemed to be valid. As a contemplated variation, the GW may continue to offer the same SSID service from then onwards for purposes of synching the IoT client device data to the portal (triggered either by user intervention or web service). See step 66.

Accordingly, embodiments disclosed herein provide relatively simple mechanisms for limited capability IoT devices (i.e., client devices with firmware but with limited user interface capabilities) to detect, configure and sync data via IoT networks relying on BT, Wi-Fi, or like communications via use of a smart phone, a IoT Gateway, or like CPE. Thus, the embodiments provide a relatively easy process to configure and exchange data between AP/GW and other IoT devices. Configuration is greatly simplified and requires minimal human intervention.

Figure 4:
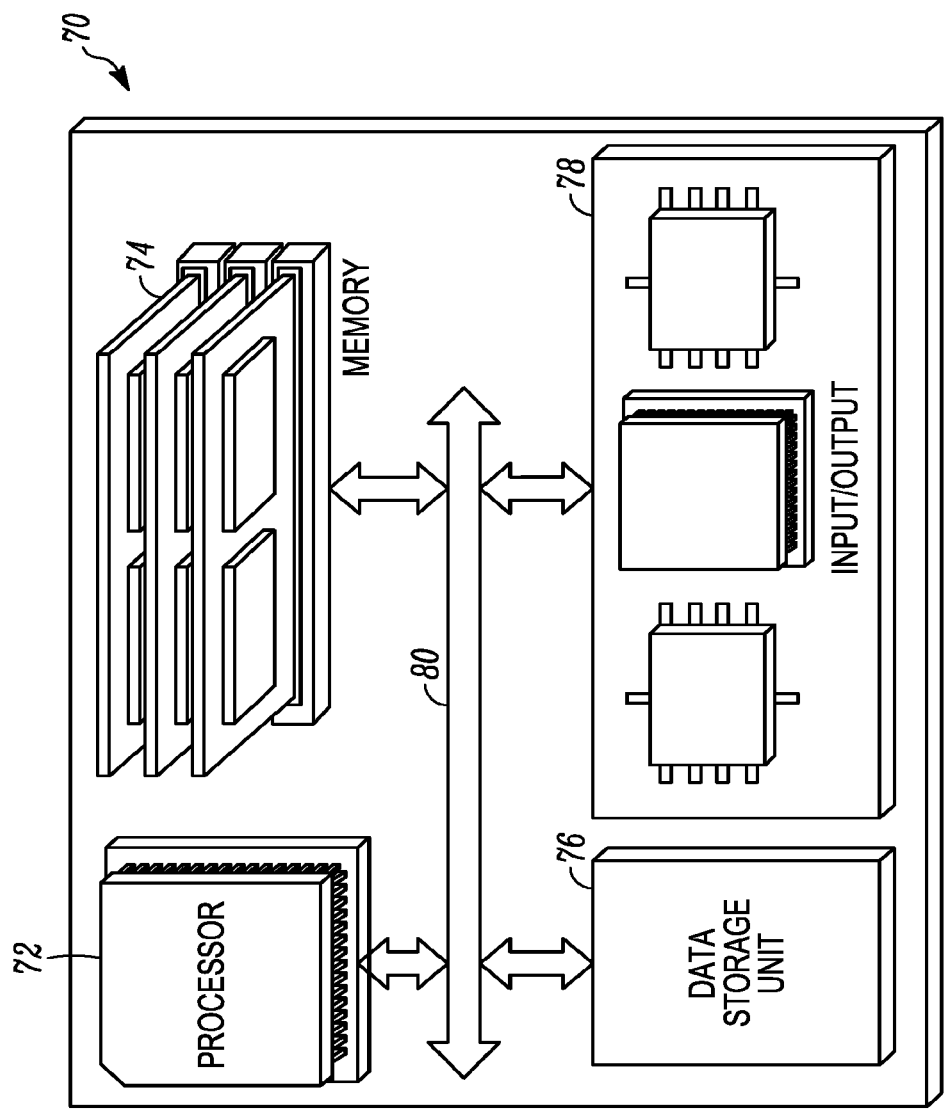
FIG. 4 is a block diagram of hardware configuration of CPE in accordance to an embodiment.

FIG. 4 is a block diagram of a hardware configuration of a CPE device 70 operable to facilitate the pairing of a client or IoT device with a network service while minimizing user-input. It should be understood that the hardware configuration may exist in various types of devices, such as gateways, extenders, and the like. The hardware configuration may include a processor 72, memory 74, a storage device 76, an input/output device 78, and the like. Each of the components 72, 74, 76 and 78, for example, may be interconnected using a system bus 80 or the like. The processor 72 can be capable of processing instructions for execution within the hardware configuration and may be capable of processing instructions stored in the memory 74 or on the storage device 76. The processor 72 may be configured to carry out any of the processes discussed above.

The input/output device 78 provides input/output operations for the hardware configuration. In embodiments, the input/output device 78 may include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., whole-home network 18 of FIG. 1, access network 20 of FIG. 1, etc.).

A system for carrying out any of the above disclosed methods or arrangements may include software or the like provided on a circuit board or within another electronic device and can include various processors, microprocessors, modules, units, components, controllers, chips, disk drives, and the like. It will be apparent to one of ordinary skill in the art that systems, modules, components, units, processors, servers, and the like may be implemented as electronic components, software, hardware or a combination of hardware and software for purposes of providing a system.

Embodiments may also include at least one non-transitory computer readable storage medium having computer program instructions stored thereon that, when executed by at least one processor, can cause the at least one processor to perform any of the steps described above.

While the principles of the invention have been described above regarding specific devices, apparatus, systems, algorithms, and/or methods, it is to be clearly understood that this description is made only by way of example and not as limitation One of ordinary skill in the art will appreciate that various modifications and changes can be made without departing from the scope of the claims below.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims.

I claim:

1. A method of a device to configure an Internet of Things (IoT) client device at a customer premises, the method comprising:
receiving a configuration message providing configuration information for the IoT client device, the configuration information including a device-specific unique password required to connect to a service and a link to the service that is detectable for use in configuring the IoT client device via communications with a remote configuration server or a cloud-based web portal, wherein the device comprises a Customer Premise Equipment (CPE) device or a portable communication device;
automatically turning-on a Bluetooth low energy (BLE) of the device or a cellular data of the device based on the configuration message;
providing the link to the service to the IoT client device at the customer premises via a browser or an application that is launched on the device after receiving the configuration message so that the IoT client device automatically pairs to the service associated with the link and is authenticated to the remote configuration server or the cloud-based web portal using the device-specific unique password via Internet connectivity capability of the device, the IoT client device having firmware preprogrammed to automatically access the service for use in configuring the IoT client device when a name of the service is detected by the IoT client device at the customer premises;
configuring the IoT client device using the browser or the application launched on the device to provide required user data; and
removing the service from the device.

2. The method according to claim 1, wherein the configuration message is received by the device, and the device comprises a network gateway device configured to be communicatively coupled to the Internet via a wide area network, and further configured to be communicatively coupled to the IoT client device via a local area network for enabling the IoT client device to send and receive data over the Internet.

3. The method according to claim 1, wherein:
if the device is the CPE device, the device comprises an IoT Gateway or extender,
if the device is the portable communication device, the device comprises a smartphone, and
the IoT client device is without a user interface.

4. The method according to claim 1, wherein the configuration message is directed to a user-indicated mobile phone number.

5. The method according to claim 1, wherein
the device-specific unique password is an electronic address or telephone number associated with the device, and
the service is a Wi-Fi secure pairing service, and a name provided with the configuration information is a service set identifier (SSID) associated with the Wi-Fi secure pairing service.

6. The method according to claim 5, wherein, once the configuration message providing the configuration information for the IoT client device is received, the method further comprises:
turning on a Wi-Fi access point (AP) of the device or a Wi-Fi hotspot of the device using the SSID and the unique password, the IoT device automatically pairing with the Wi-Fi secure pairing service.

7. The method according to claim 1, wherein, after the IoT client device is configured, the method further comprises:
continuing to make the service available to the IoT client device, via the browser or the application launched on the device, for syncing IoT client device data from the IoT client device to the cloud-based web portal.

8. A Customer Premise Equipment (CPE) device for configuring an Internet of Things (IoT) client device at a customer premises, the CPE device comprising:
a network gateway device configured to be communicatively coupled to the Internet via a wide area network, and further configured to be communicatively coupled to the IoT client device in a local area network for enabling the IoT client device in the local area network to send and receive data over the Internet; and
at least one processor of the network gateway device, the at least one processor configured to:
receive a configuration message providing configuration information for the IoT client device, the configuration information including a device-specific unique password required to connect to a service and a link to the service that is detectable for use in configuring the IoT client device via communications with a remote configuration server,
automatically turn-on a Bluetooth low energy (BLE) of the CPE device or a cellular data of the device based on the configuration message;
provide the link to the service to the IoT client device at the customer premises via a browser or an application that is launched on the CPE device after receiving the configuration message, so that the IoT client device automatically pairs to the service associated with the link and is authenticated to the remote configuration server using the device-specific unique password via Internet connectivity capability of the CPE device, the IoT client device having firmware preprogrammed to automatically access the service for use in configuring the IoT client device when a name of the service is detected by the IoT client device at the customer premises,
configure the IoT client device using the browser or the application launched on the CPE device to provide required user data; and
remove the service from the device.

9. The CPE device according to claim 8, wherein:
the IoT client device is without user interface, and
the CPE device is an IoT Gateway configured to aggregate, monitor or control IoT devices.

10. The CPE device according to claim 8, wherein the configuration message is directed to a user-indicated mobile phone number.

11. The CPE device according to claim 8 wherein
The device-specific unique password is an electronic address or telephone number associated with the CPE device, and
the service is a Wi-Fi secure pairing service, and a name is a service set identifier (SSID) associated with the Wi-Fi secure pairing service.

12. The CPE device according to claim 11, wherein, after receiving the configuration message providing the configuration information for the IoT device, the at least one processor is further configured to:
turn on a Wi-Fi access point (AP) of the CPE device using the SSID and the unique password, the IoT device automatically pairing with the Wi-Fi secure pairing service.

13. The CPE device according to claim 8, wherein, after the IoT client device is configured, the at least one processor is further configured to:
continue making the service available to the IoT client device, via the browser or the application launched on the CPE device, for syncing IoT client device data from the IoT client device to a cloud-based web portal.

* * * * *